United States Patent [19]

Chou

[11] Patent Number: 5,158,484

[45] Date of Patent: Oct. 27, 1992

[54] ELECTRICAL PLUG FOR AUTOMOBILE CIGARETTE LIGHTER SOCKETS

[76] Inventor: Wen-San Chou, P.O. Box 82-144, Taipei, Taiwan

[21] Appl. No.: 815,150

[22] Filed: Dec. 31, 1991

[51] Int. Cl.[5] ............................................. H01R 13/10
[52] U.S. Cl. .................................................... 439/668
[58] Field of Search ............................... 439/668, 669

[56] References Cited

U.S. PATENT DOCUMENTS

| | | | |
|---|---|---|---|
| 3,309,598 | 3/1967 | Montgomery et al. | 439/668 |
| 3,865,463 | 2/1975 | Busch | 439/668 |
| 5,116,248 | 5/1992 | Hiers et al. | 439/669 |

Primary Examiner—Joseph H. McGlynn
Attorney, Agent, or Firm—Alfred Lei

[57] ABSTRACT

This invention relates to an electrical plug for automobile cigarette lighter sockets and in particular to one including a body portion formed with four slots and external threads at one end and a tubular member at the other, a cover provided with a pin at the center and threads in the inner side, two conductor rings each provided with a hole at one end and two curved portions with different curvatures, and a connector connected with the two conductor rings by a screw, whereby the electrical plug may be conveniently adapted to various kinds of automobile cigarette lighter sockets.

1 Claim, 4 Drawing Sheets

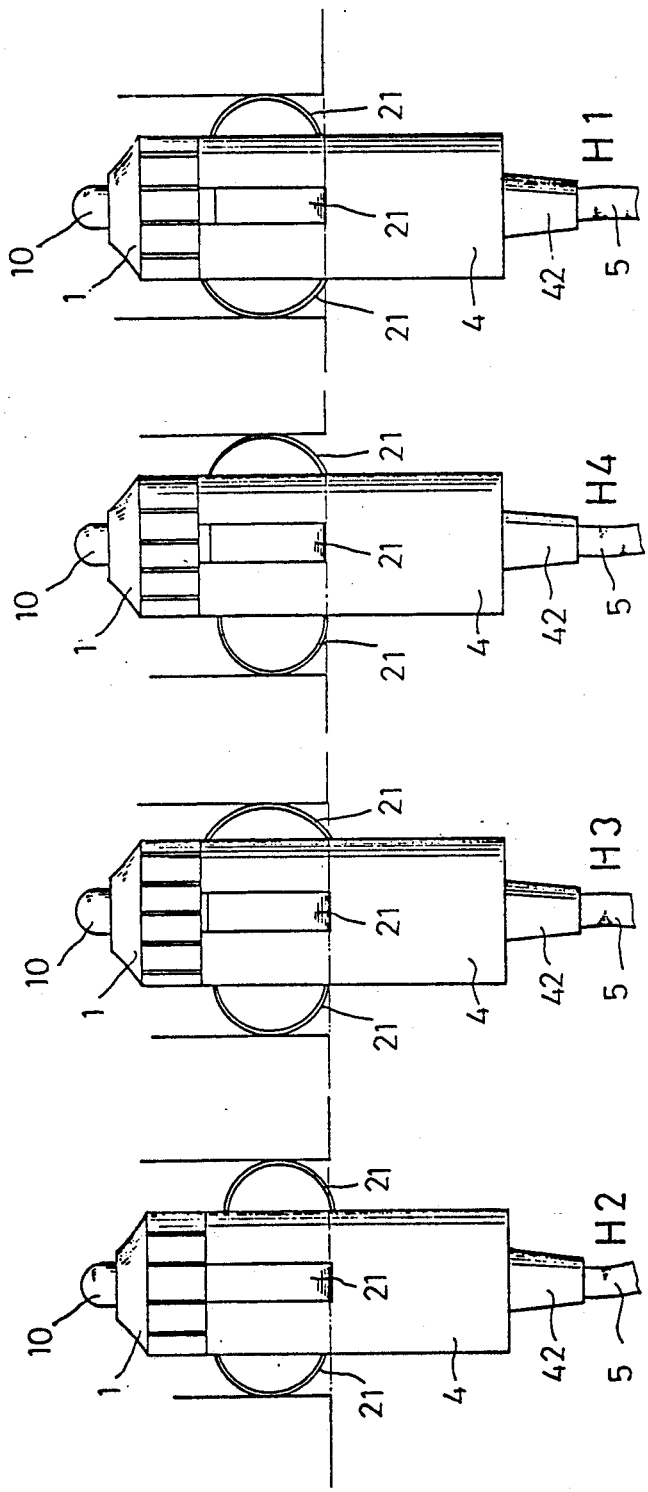
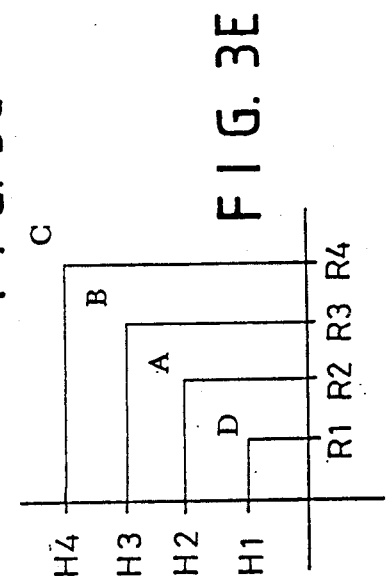
FIG. 3A  FIG. 3B  FIG. 3C  FIG. 3D  FIG. 3E

ELECTRICAL PLUG FOR AUTOMOBILE CIGARETTE LIGHTER SOCKETS

BACKGROUND OF THE INVENTION

It is found that the prior art electrical plug for automobile cigarette lighter sockets on the market has the following drawbacks:

1. It can be adapted to only one particular type of automobile cigarette lighter socket and cannot be used with another type of automobile cigarette lighter socket.
2. It cannot be well fitted with the automobile cigarette lighter socket.
3. It cannot be firmly connected with the electrical wire which often results in short-circuit.

Therefore, it is an object of the present invention to provide an electrical plug for automobile cigarette lighter sockets which may obviate and mitigate the above-mentioned drawbacks.

SUMMARY OF THE INVENTION

This invention relates to an improved electrical plug for automobile cigarette lighter sockets.

It is the primary object of the present invention to provide an electrical plug for automobile cigarette lighter sockets which may be adapted to various kinds of automobile cigarette lighter sockets.

It is another object of the present invention to provide an electrical plug for automobile cigarette lighter sockets which can be easily connected with various kinds of automobile cigarette lighter sockets.

It is still another object of the present invention to provide an electrical plug for automobile cigarette lighter sockets which can be firmly connected with an electrical wire.

It is sitll another object of the present invention to provide an electrical plug for automobile cigarette lighter sockets which is simple in construction.

It is a further object of the present invention to provide an electrical plug for automobile cigarette lighter sockets which is economic to produce.

Other objects and merits and a fuller understanding of the present invention will be obtained by those having ordinary skill in the art when the following detailed description of the preferred embodiment is read in conjunction with the accompanying drawings.

BRIEF DESCRIPTION OF THE DRAWINGS

FIGS. 3A, 3B, 3C, 3D and 3E show the working principle of the present invention.

DETAILED DESCRIPTION OF THE PREFERRED EMBODIMENT

Figure 1:
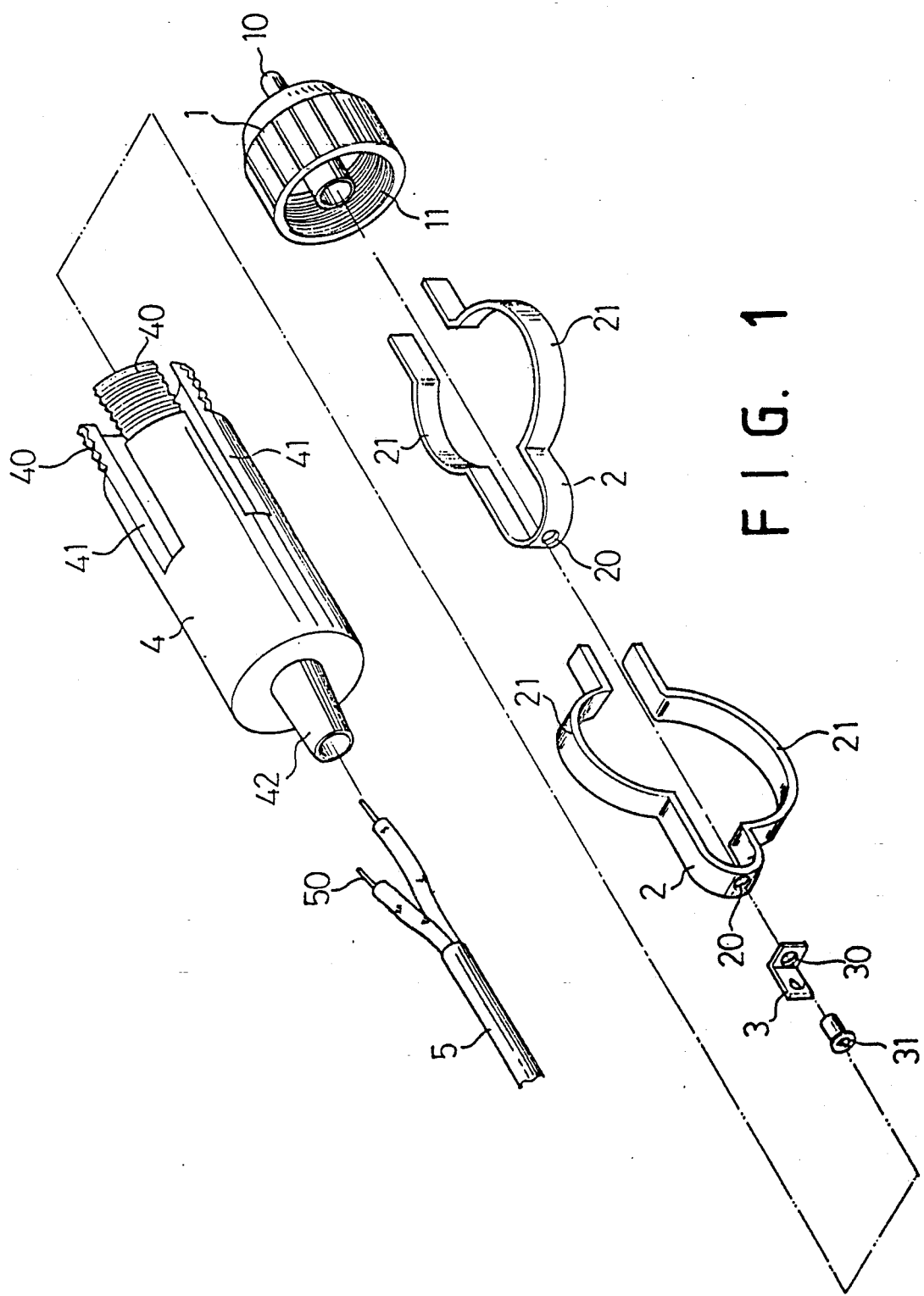
FIG. 1 is an exploded view of the present invention.
Figure 2:
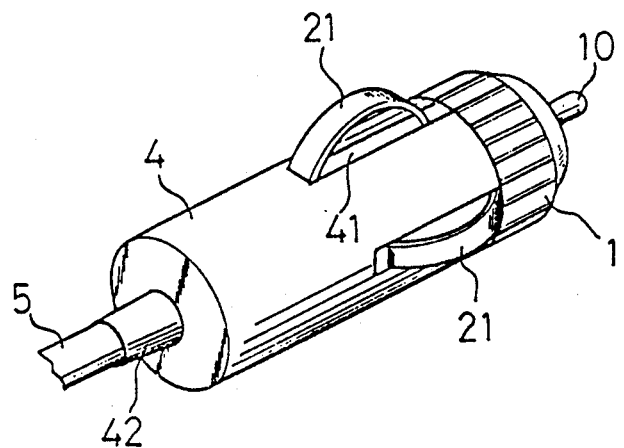
FIG. 2 is a perspective view of the present invention.
Figure 4:
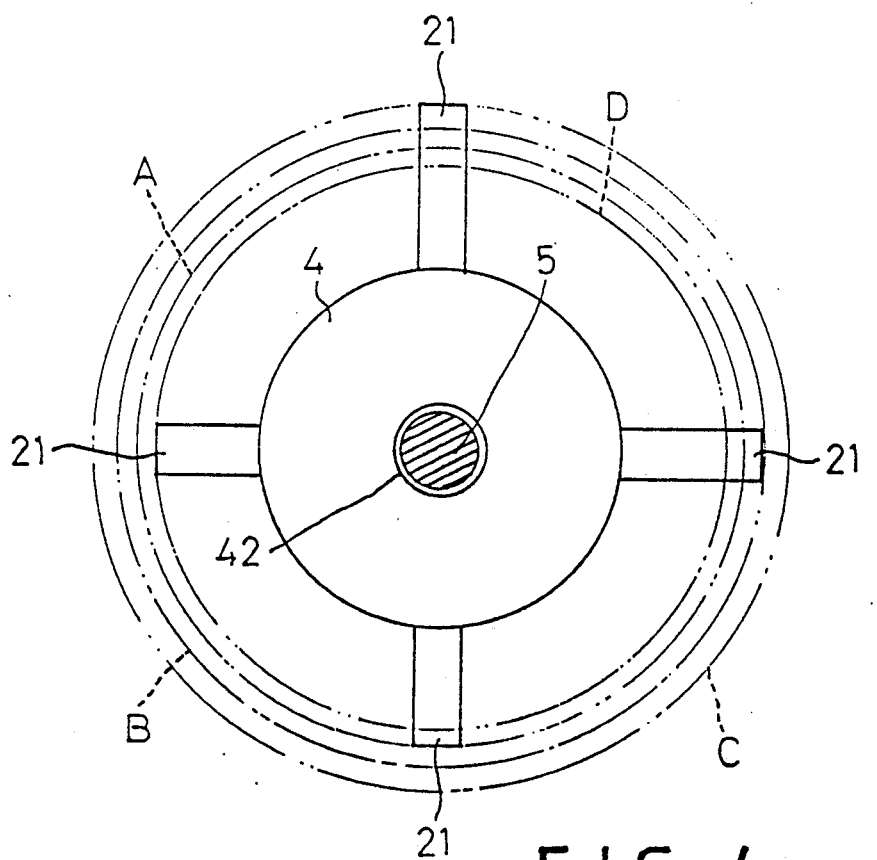
FIG. 4 is an end view of the present invention.
Figure 5:
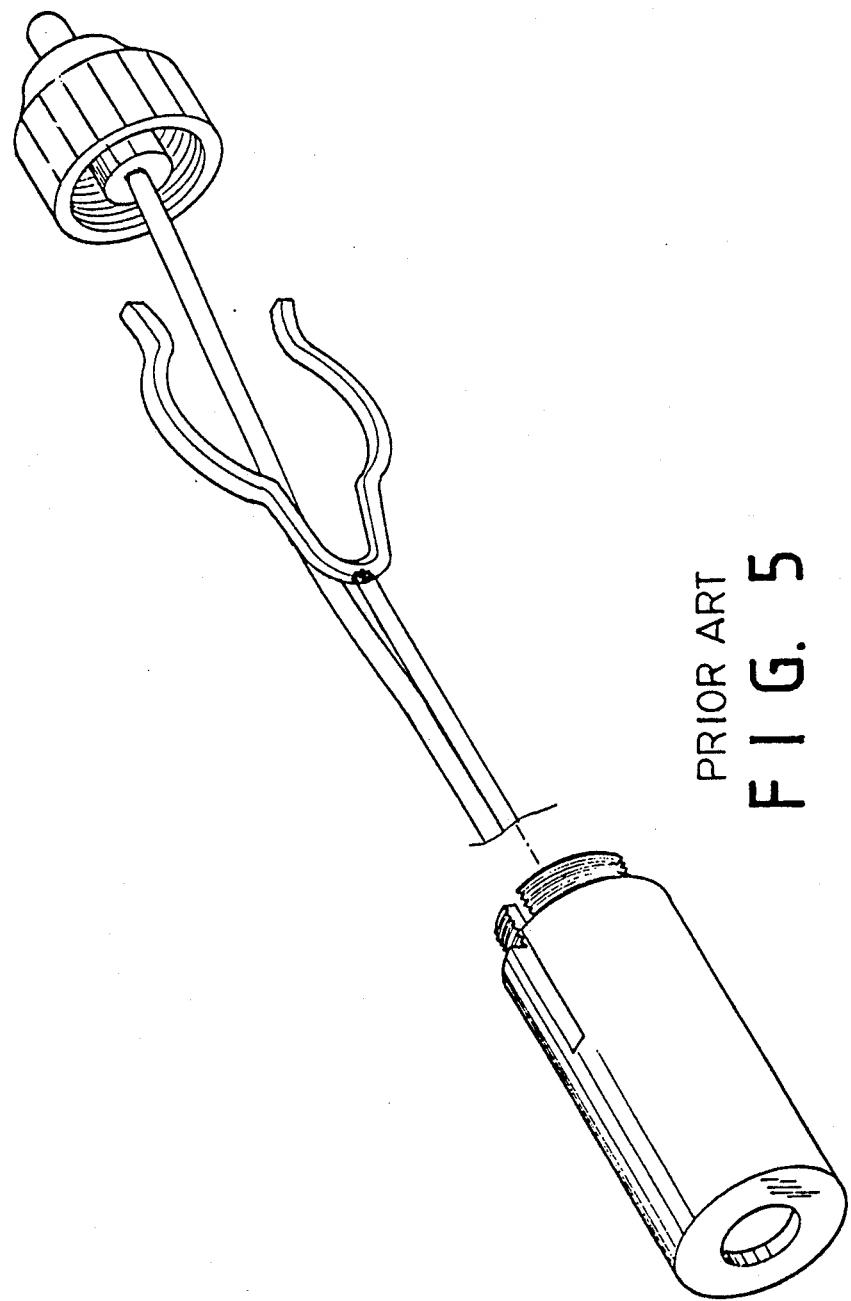
FIG. 5 shows a prior art electrical plug for automobile cigarette lighter sockets.

With reference to the drawings and in particular to FIGS. 1 and 2 thereof, the electrical plug for automobile cigarette lighter sockets according to the present invention mainly comprises a cover 1, a body portion 4, two conductor rings 2, and a connector 3.

The cover 1 is provided with a center pin 10 at the center and threades 11 in the inner side.

The body portion 4 is formed with four slots 41 and external threads 40 at one end and a tubular member 42 at the other. The tubular member 42 is designed for the passage of the naked conductor 50 of the electrical wire 5.

The conductor ring 2 is provided with a hole 20 at the left end (with respect to FIG. 1) and two curved portions 21 with different curvatures.

In assembly, referring again to FIGS. 1 and 2, the two conductor rings 2 are disposed perpendicular to each other so that their holes 20 are in alignment with each other. Then, the two conductor rings 2 are joined together with the connector 3 by a screw 31. Thereafter, the electrical wire 5 is passed into the body portion 4 through the tubular member 42 with one naked conductor 50 soldered with the connector 3 and the other with the pin 10 thereby forming a circuitry. Afterwards, the two conductor rings 2 are inserted into the slots 41 of the body portion 4. Finally, the body portion 4 is connected with the cover 1 with the internal threads 11 engaged with the external threads 40.

Looking now at FIGS. 3A, 3B, 3C, 3D and 3E, since the curved portions 21 of the two conductor rings are of different curvatures, the present invention may be adapted to various cigarette lighter sockets. For example, the cigarette lighter sockets with diameters R1, R2, R3 and R4 are respectively adapted to the connecting types H1, H2, H3 and H4.

In conclusion, the present invention has the following advantages:

1. It may adapted to various kinds of the cigarette lighter sockets.
2. It can be easily connected with any kind of cigarette lighter sockets.
3. As the electrical wire is soldered with the connector 3 which is of a large area, the electrical wire 5 can be fixedly connected with the present invention.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. An electrical plug for automobile cigarette lighter sockets comprising:
    a body portion formed with four slots and external threads at one end and a tubular member at the other;
    a cover provided with a pin at the center and threads in the inner side, said cover being threadely engaged with said body portion;
    two conductor rings each provided with a hole at one end and two curved portions with different curvatures, said two conductor rings being disposed perpendicular to each other so that the holes of said two conductor rings are in alignment with each other; and
    a connector connected with said two conductor rings by a screw.

* * * * *